United States Patent
Hoegberg

(10) Patent No.: US 10,838,794 B2
(45) Date of Patent: Nov. 17, 2020

(54) RATE BASED FAULT RESTART SCHEME

(71) Applicant: Hamilton Sundstrand Corporation, Charlotte, NC (US)

(72) Inventor: Lon R. Hoegberg, Belvidere, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 129 days.

(21) Appl. No.: 16/106,978

(22) Filed: Aug. 21, 2018

(65) Prior Publication Data

US 2020/0065175 A1  Feb. 27, 2020

(51) Int. Cl.
G06F 11/00 (2006.01)
G06F 11/07 (2006.01)
G06F 11/14 (2006.01)

(52) U.S. Cl.
CPC ...... *G06F 11/0739* (2013.01); *G06F 11/1438* (2013.01); *G06F 2201/805* (2013.01)

(58) Field of Classification Search
CPC ............ G06F 11/0739; G06F 11/1438; G06F 11/0706; G06F 11/0736; G06F 11/0754; G06F 11/076; G06F 11/0796; G06F 11/1402; G06F 11/1441; G06F 2201/805; G06F 2201/81

See application file for complete search history.

(56) References Cited

U.S. PATENT DOCUMENTS

| | | | |
|---|---|---|---|
| 4,080,589 A * | 3/1978 | Kline | G01R 23/15 377/28 |
| 4,477,748 A | 10/1984 | Grubbs | |
| 4,774,669 A * | 9/1988 | Schmitz | B61L 15/0036 246/5 |
| 5,999,549 A | 12/1999 | Freitag et al. | |
| 6,453,430 B1 * | 9/2002 | Singh | G06F 11/0715 712/227 |
| 2009/0048689 A1 | 2/2009 | Pelton et al. | |
| 2009/0164057 A1 | 6/2009 | Lecerf | |
| 2010/0010692 A1 | 1/2010 | Broderick et al. | |

FOREIGN PATENT DOCUMENTS

JP    2017038316 A    2/2017

OTHER PUBLICATIONS

Search Report for European Application No. 19191037.1; Application Filing Date Aug. 9, 2019; dated Dec. 19, 2019 (6 pages).

* cited by examiner

*Primary Examiner* — Anthony J Amoroso
(74) *Attorney, Agent, or Firm* — Cantor Colburn LLP

(57) ABSTRACT

A fault detection circuit includes a system controller and a fault detection controller. The system controller includes at least one memory device to control at least one electrical system. The fault detection controller communicates with the system controller to detect at least one fault of the system controller and to control operation of the system controller based on comparison between a frequency of detected faults corresponding to the system controller and at least one frequency threshold value.

14 Claims, 4 Drawing Sheets

RATE BASED FAULT RESTART SCHEME

BACKGROUND

Exemplary embodiments pertain to the art of aircraft electrical systems, and more particularly, to an aircraft electrical fault detection system.

Aircraft vehicles employ a variety of means to detect electrical system faults. Traditional methods for detecting electrical faults include both hardware monitoring systems and software monitor systems. Electrical faults can be categorized as soft errors and hard errors. Soft errors include, for example, an unexpected change in a value stored in random access memory (RAM), an unexpected change in configuration information in a processor or field programmable gate array (FPGA) register or flip-flop, and incorrect software execution due to an unexpected change in a RAM, program counter, and/or register value. Hard errors include, for example, a permanent failure of a RAM location to be able to maintain a stored value, a permanent failure of a register or flip-flop to be able to maintain the correct value, and incorrect software execution due to a failed connection on a data bus or a bad power supply. A detection of a soft error involves restarting the system to recover the normal operating state. A detection of a hard fault, however, typically results in placing the system in a limited operating mode or Failsafe state until undergoing further maintenance or inspection.

BRIEF DESCRIPTION

According to a non-limiting embodiment a fault detection circuit includes a system controller and a fault detection controller. The system controller includes at least one memory device to control at least one electrical system. The fault detection controller communicates with the system controller to detect at least one fault of the system controller and to control operation of the system controller based on comparison between a frequency of detected faults corresponding to the system controller and at least one frequency threshold value.

According to another non-limiting embodiment, a method of controlling a fault detection circuit comprises controlling, via a system controller including at least one memory device, at least one electrical system of a vehicle, and detecting, via a fault detection controller, at least one fault of the system controller. The method further comprises controlling operation of the system controller based on comparison between a frequency of detected faults corresponding to the system controller and at least one frequency threshold value.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

During operation, an aircraft can experience a Single Event Effect (SEE) which is categorized as a soft error. The SEE can be caused by an unexpected state change of a memory unit such as a flip flop or RAM cell due to atmospheric radiation. A system restart is then performed in order to restart the system affected by the SEE. However, these system restarts are typically limited to a fixed number or fixed fault threshold. As a result, a repeating fault or non-recoverable fault will cause the fixed number of restart attempts to be reached quickly. Once the fault threshold is reached, the soft error is deemed to be a hard error and the system is placed into the Failsafe state. When in the Failsafe state, the outputs of the unit or controller are limited in order to cause minimal system impact. Once this occurs, manual intervention such a cycling the power is required to restore the unit to normal operation.

SEE errors are more likely to occur at high altitudes, and are common during long flights and while aircraft electronic units remain powered for extended periods of time. Therefore, it is possible that enough SEE errors will occur to reach the fault threshold and invoke the Failsafe mode of an otherwise properly working unit. Consequently, the operation of the aircraft and electronic equipment can be unnecessarily limited.

Various non-limiting embodiments described herein replaces the traditional fixed number of system restarts, i.e., the fixed fault threshold, with a rate-based condition for invoking the Failsafe mode. The rate-based scheme described herein is more tolerant to SEE errors because it allows an unlimited number of system restarts, on condition that the frequency of system restarts does not exceed a frequency threshold.

Figure 1:
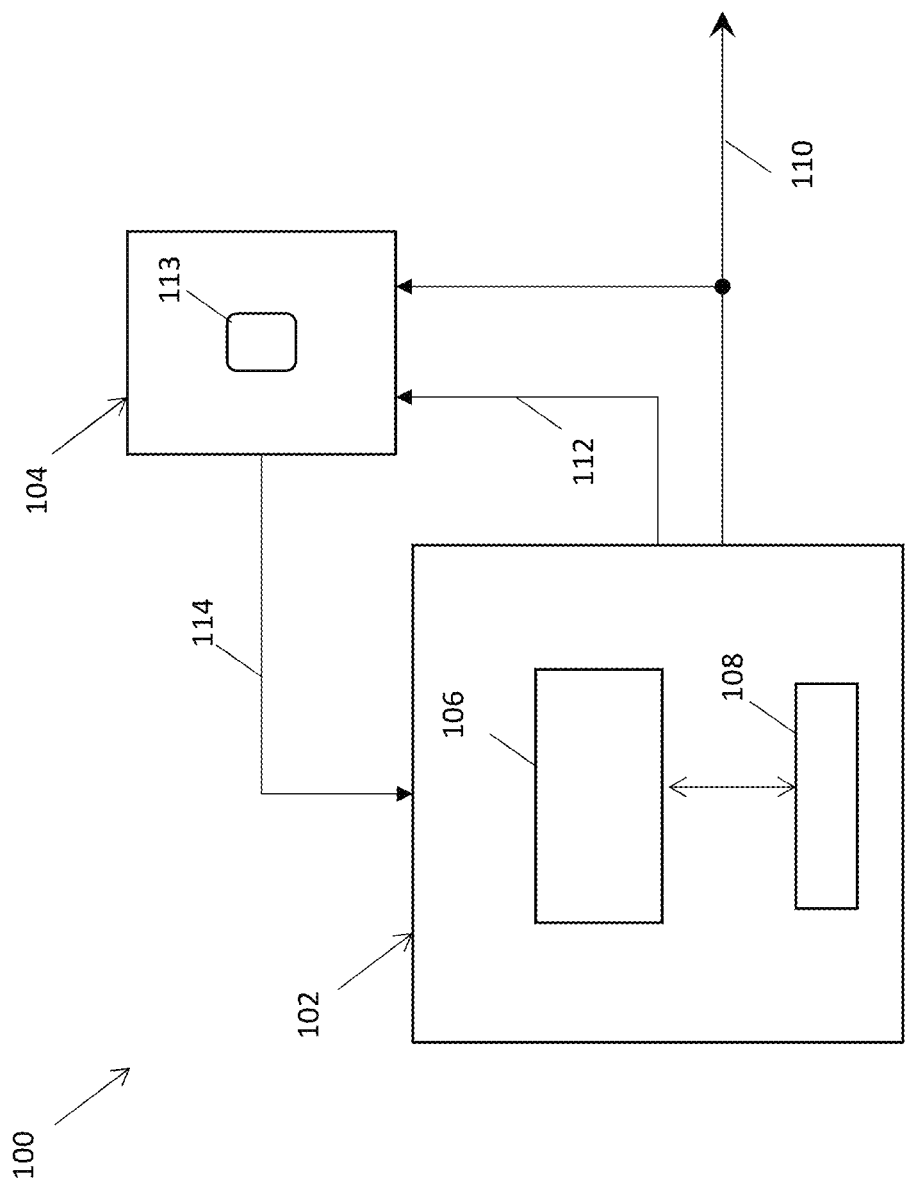
FIG. 1 is a block diagram illustrating a fault detection circuit according to a non-limiting embodiment.

Turning now to FIG. 1, a fault detection circuit 100 is illustrated according to a non-limiting embodiment. The fault detection circuit 100 includes a system controller 102 and a fault detection controller 104. The system controller 102 is configured to control one or more electrical system of a vehicle (e.g., an aircraft). The system controller 102 can be constructed as an electronic hardware controller that includes one or more memory devices 106 and a processor 108 configured to execute algorithms and computer-readable program instructions stored in the memory device(s). The memory device(s) 106 include, but are not limited to, random access memory (RAM), a memory register, a flip-flop, and a binary counter.

The system controller 102 can operate in a normal operating mode and a Failsafe mode. The normal operating mode allows the system controller 102 to output one or more control signals 110 to control operation of an electrical system installed on the vehicle in a normal and expected manner. When experiencing one or more soft errors while operating in the normal mode, the system controller 102 is allowed to undergo one or more restarts that aims to return the system controller 102 to the expected normal mode of operation. The Failsafe mode, places the system controller 102 in a limited operating mode. While operating in the Failsafe mode, the operation of the system controller 102 and/or the outputs of the system controller 102 may be limited until undergoing further maintenance or inspection.

The system controller 102 can also output a fault monitoring signal 112, which indicates an operating state of the system controller 102. For example, the system controller 102 can detect an internal fault and output the fault monitoring signal 112 indicating the detected internal fault. The internal fault includes, but is not limited to, an unexpected change in a value stored in the memory device 106 and an unexpected change in configuration information of the system controller 102 and/or memory device 106.

The fault detection controller 104 is in signal communication with the system controller 102, and is configured to detect one or more faults associated with the system controller 102. The fault detection controller 104 can be constructed as an electronic hardware controller that includes one or more memory devices (not shown) and a processor (not shown) configured to execute algorithms and computer-readable program instructions stored in the memory device(s).

The fault detection controller 104 can monitor the control signal 110 and/or the fault monitoring signal 112 to determine whether the system controller 102 has experienced a fault. For example, the fault detection controller 104 can detect the presence of a fault associated with the system controller 102 when the control signal 110 is unexpectedly halted or disconnected. In another example, the fault detection controller 104 may detect a first binary value (e.g., "0") from the fault monitoring signal 112 when no internal faults are detected by the system controller 102, but may suddenly detect a second binary value (e.g., "1") when the system controller 102 detects an internal fault.

In either case, the fault detection controller 104 can generate a control signal 114 that either restarts the system controller 102 with the aim of returning the system controller 102 to an operating state that is expected during the normal operating mode, or invokes a Failsafe mode. As described herein, the Failsafe mode limits operating capability of the system controller 102, or completely shuts down the system controller 102. In this manner, the continuous faults experienced by the system controller 102 can be mitigated or fully isolated from affecting operation of the vehicle.

In various non-limiting embodiments described herein, the fault detection controller 104 is configured to control the operation of the system controller 102 based on comparison between a frequency of detected errors corresponding to the system controller 102 and at least one frequency threshold value. In at least one example, the fault detection controller 104 includes one or more counters 113 that tracks a soft error associated with the system controller 102. The counter 113 can be dynamically incremented or decremented based on whether or not a fault is detected during a detection time period. In any case, the fault detection controller 104 can determine one or more frequencies or rates at which faults associated with the system controller 102 are detected. The frequency or rate of the faults can then be compared to a threshold value to determine whether to allow the system controller 102 to continue undergoing a restart or reboot operation, or whether to invoke a Failsafe mode to prevent the continuing faults to negatively affect the overall operation of the vehicle.

For example, a fault frequency threshold can be set to five faults per minute. When the detected faults is five or less per minute, the fault detection controller 104 can output a control signal 114 to restart the system controller 102 while maintaining the normal operating mode. When, however, the detected faults exceeds five per minute, the fault detection controller 104 can output a control signal 114 commanding the system controller 102 to operate in the Failsafe mode. Accordingly, the output from the system controller 102 can be limited or completely shut down to prevent the system controller 102 from negatively affecting the overall operation of the vehicle. In this manner, the fault detection circuit 100 can be more tolerant to SEE errors because the fault detection circuit 100 allows an unlimited number of system restarts, on the condition that the frequency of detected errors resulting in the frequency of restarts does not exceed a frequency threshold.

The non-limiting embodiment described above implements the fault detection controller 104 as a separate controller independent and located remotely from the system controller 102. In other embodiments, the fault detection controller 104 can be implemented within the system controller 102. In other non-limiting embodiments, the processor 108 of the system controller 102 can perform the operations of the fault detection controller 104 without departing from the scope of the invention.

Figure 2:
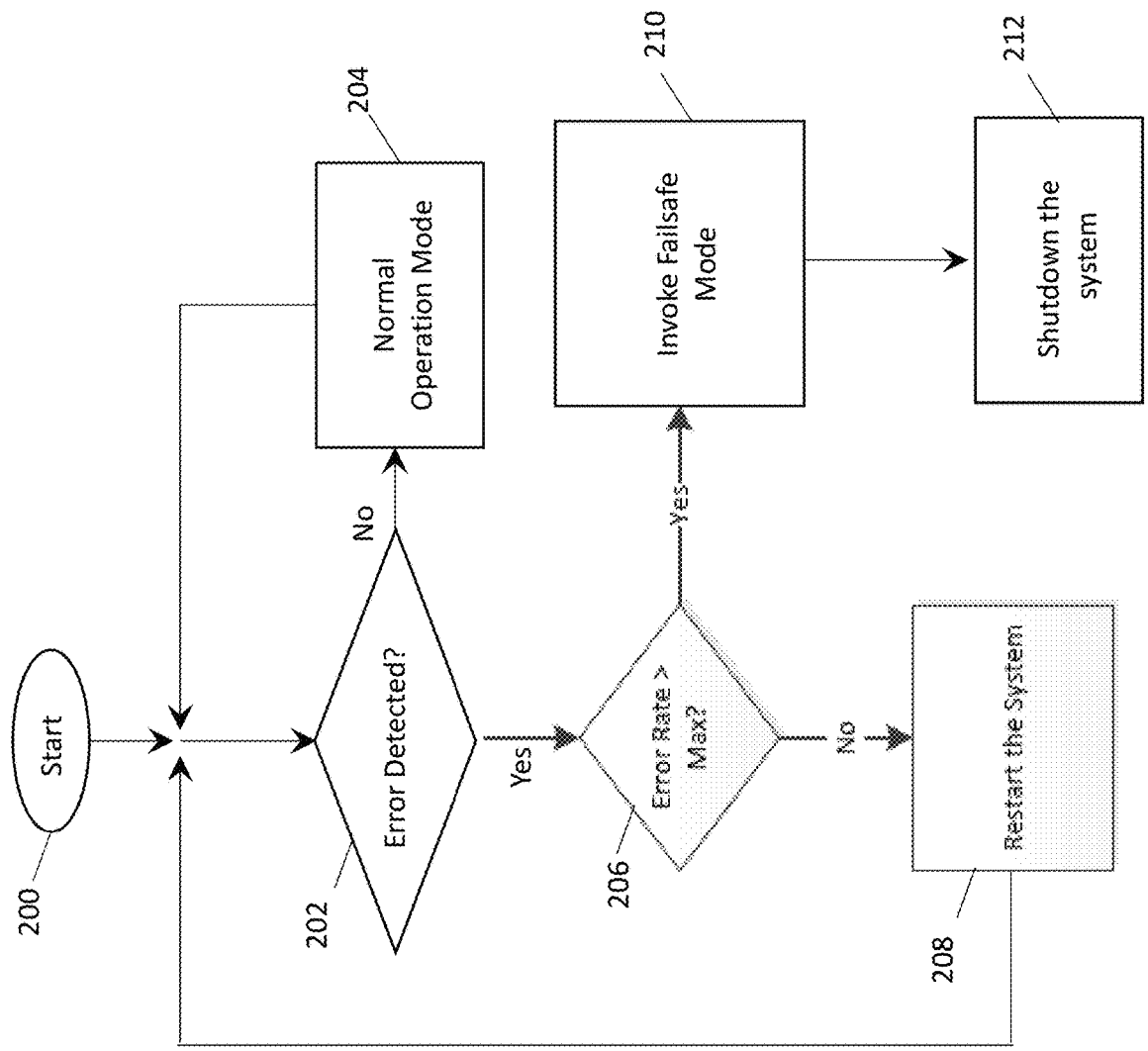
FIG. 2 is a flow diagram illustrating a method of controlling a fault detection circuit based on a rate-based fault management scheme according to a non-limiting embodiment.

Referring now to FIG. 2, a flow diagram illustrates a method of controlling a fault detection circuit according to a rate-based fault management scheme is illustrated according to a non-limiting embodiment. The method begins at operation 200, and at operation 202 the fault detection circuit determines whether an error or fault associated with a system controller or control system is detected. The system controller or control system can be generally referred to as the system being monitored. In one or more embodiments, a fault detection controller monitors operation of the system controller in order to detect one or more faults. When no fault is detected, the system controller is commanded to operate in a normal operating mode at operation 204, and the method returns to operation 202 to continue monitoring the system controller for a fault. When, however, a fault is detected the fault detection controller determines whether a fault rate associated with the system controller exceeds a rate threshold at operation 206.

When the fault rate has not exceeded the rate threshold, the fault detection controller commands the system controller to restart at operation 208, and the method returns to operation 202 to continue monitoring the system controller for faults. When, however, the fault rate exceeds the rate threshold, the fault detection controller commands the system controller to invoke a Failsafe mode at operation 210. In at least one embodiment, the Failsafe mode includes shutting down the system controller at operation 212 so that the faulty operation of the system controller does not negatively affect the overall operation of the vehicle.

Figure 3:
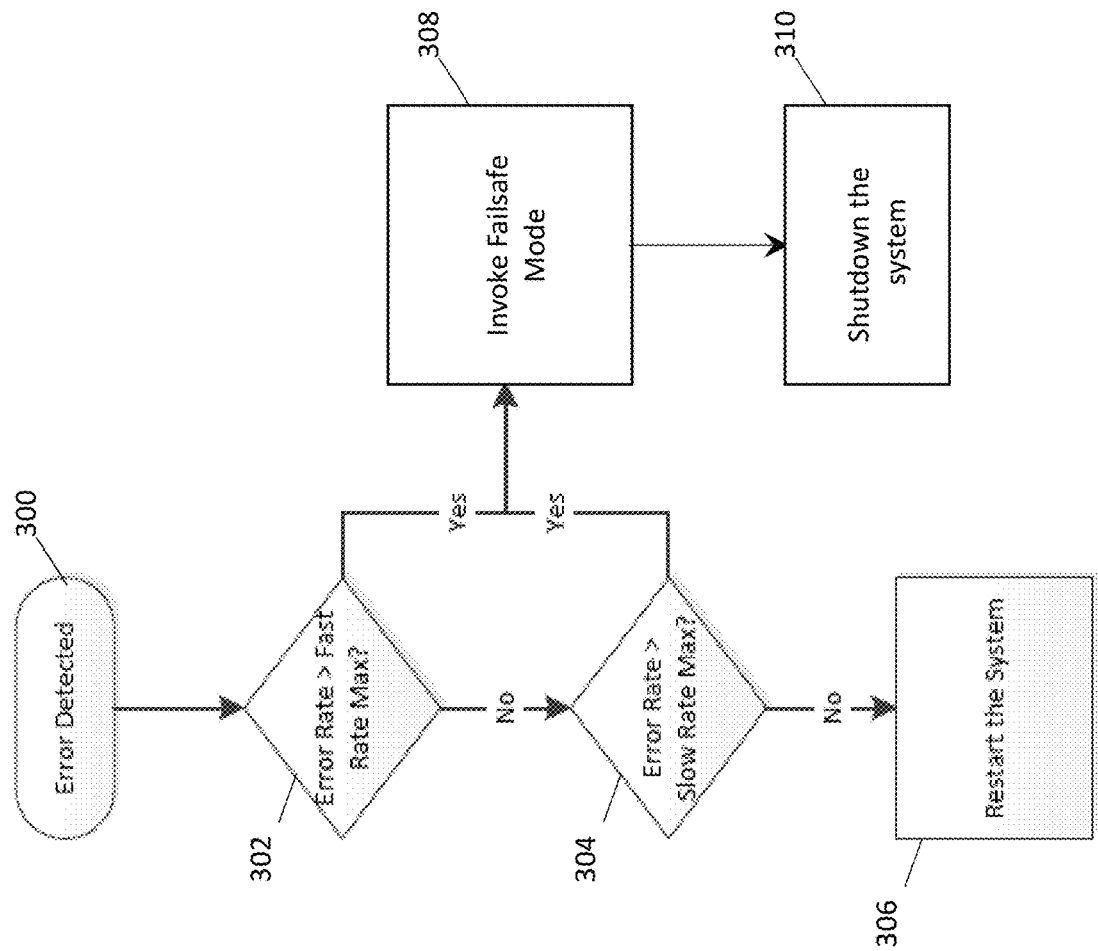
FIG. 3 is a flow diagram illustrating a method of controlling a fault detection circuit based on a rate-based fault management scheme according to another non-limiting embodiment.

Turning to FIG. 3, a flow diagram illustrates a method of controlling a fault detection circuit according to a rate-based fault management scheme is illustrated according to another non-limiting embodiment. In this example, the method utilizes two different error rate thresholds. A first fault rate threshold (e.g., a fast rate threshold) can be set at a first rate (e.g., 3 faults in 30 seconds), while a second fault rate threshold (e.g., a slow rate threshold) can be set a second rate (e.g., 6 faults in 2 minutes). For example, when a fault associated with the system controller is detected at operation 300, the fault rate is compared to the first fault rate threshold (e.g., a fast rate threshold) at operation 302. It should be appreciated that different fast fault rates and different slow faults rates can be employed based on the system being monitored.

When the fault rate does not exceed the first fault rate threshold, the fault rate is then compared to the second rate threshold (e.g., a slow rate threshold) at operation 304. When the fault rate does not exceed the second fault rate threshold, the fault detection controller commands the system controller to restart at operation 306. The fault detection controller can the continue monitoring the system controller for faults as described herein. When, however, the fault rate of the system controller exceeds either the first fault rate threshold or the second fault rate threshold, the fault detection controller commands the system controller to invoke the Failsafe mode at operation 308. In at least one embodiment, the Failsafe mode includes shutting down the system controller at operation 310. Although the rate-based fault management scheme illustrated in FIG. 3 employs two rates, additional rates can be utilized without departing from the scope of the present teachings.

Figure 4B:
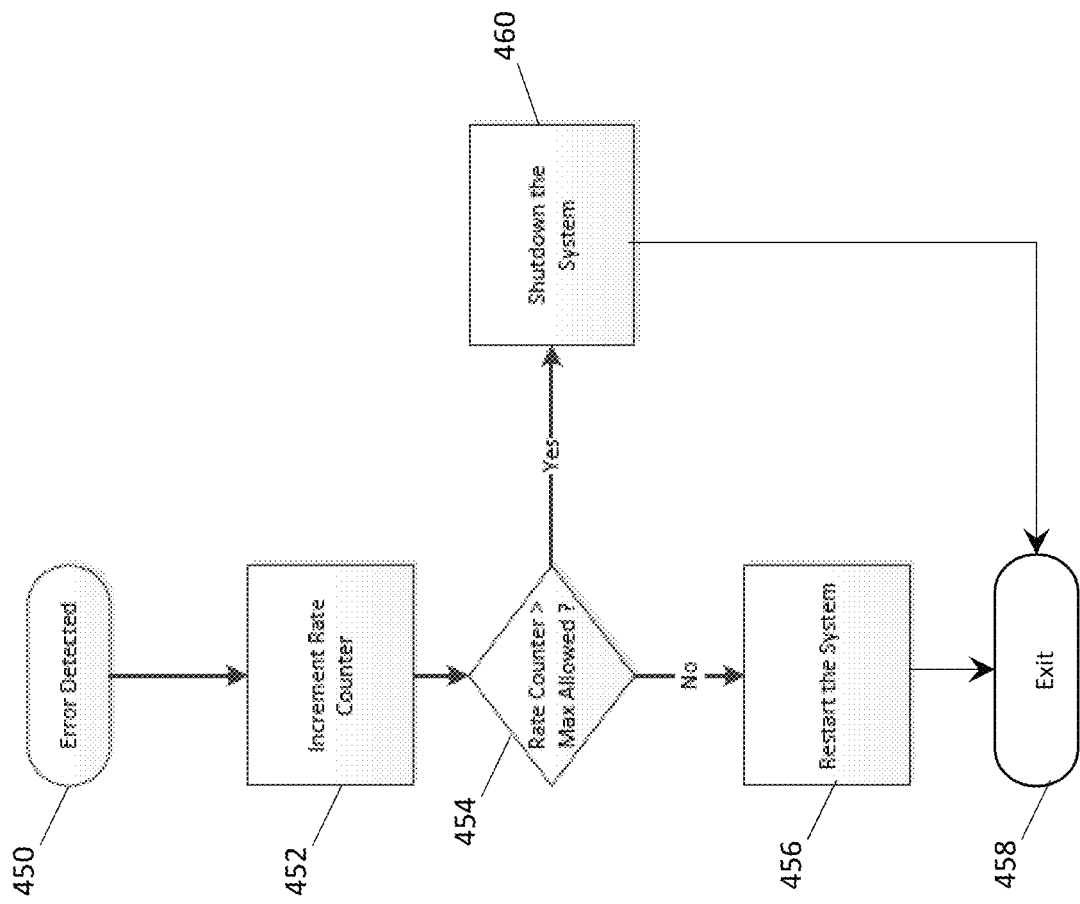
FIGS. 4A and 4B are flow diagrams illustrating a fault management scheme according to another non-limiting embodiment.
Figure 4A:
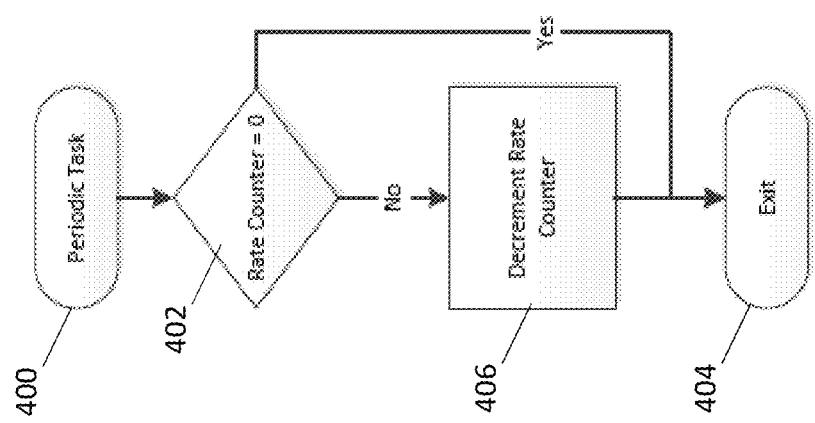

With reference now to FIGS. 4A and 4B, flow diagrams illustrate a method of controlling a fault detection circuit according to a fault management scheme according to another non-limiting embodiment. In this example, the operations of the first flow diagram (FIG. 4A) and the operations of the second flow diagram (FIG. 4B) are performed in conjunction with one another to implement an example of setting a rate at which to either restart or shutdown a controller or control system (referred to generally as a system) as described herein. The first flow diagram (FIG. 4A) can be viewed as describing a periodic rate counter adjustment stage, which decrements a rate-based error detection counter (i.e., rate counter) based on a repeating set time period. The second flow diagram (FIG. 4B) can be viewed as describing a system error management stage, which selectively restarts or shutdowns the system based on a number of detected errors indicated by the rate counter. The system error management stage (FIG. 4B) effectively shutdowns the system when the rate at which the rate counter is incremented due to a detected error exceeds the rate at which the periodic rate counter adjustment stage (FIG. 4A) decrements the rate counter.

Referring to FIG. 4A, the periodic rate counter adjustment stage is initiated at operation 400 according to repeating set time period (e.g., every 5 seconds). In this example, the periodic rate counter adjustment stage is continuously initiated at operation 400 every 5 seconds. It should be appreciated that the repeating time period can be a design parameter that is selected based on the current system being managed. At operation 402, the periodic rate counter adjustment stage determines whether a count value of the rate counter is zero "0". When the count value is "0", the periodic rate counter adjustment stage exits at operation 404. When, however, the count value is not "0", the periodic rate counter is decremented at operation 406 before the periodic rate counter adjustment stage exits at operation 404. Accordingly, the periodic rate counter adjustment stage (FIG. 4A) continuously determines whether or not to decrement the rate counter independently with respect to whether an error in the system is detected.

Turning to FIG. 4B, the system error management stage is initiated when an error associated with the system is detected at operation 450. In response to detecting the error, the count value of the rate counter is incremented at operation 452. At operation 454, a determination is made as to whether the count value of the rate counter exceeds a count value threshold. It should be appreciated that the count value threshold can be a design parameter that is selected based on the current system being managed. When the count value does not exceed the count value threshold, the system is restarted at operation 456 and the system error management stage exits at operation 458. In at least one embodiment, the count value of the rate counter does not change upon restart of the system. When, however, the count value exceeds the count value threshold, a Failsafe mode is invoked. Accordingly, the system is shutdown at operation 460, and the system error management stage exits at operation 458. Accordingly, the rate-based fault management scheme achieved by implementing the periodic rate counter adjustment stage (FIG. 4A) and the rate-based fault management scheme (FIG. 4B) facilitates one example of determining whether the rate of detected errors (i.e., the error-detection frequency) exceeds a maximum detection rate threshold (i.e., frequency threshold). The rate-based fault management scheme illustrated in FIGS. 4A-4B can be implemented using a single rate-based scheme or a multi rate-based scheme. It should be appreciated that other examples can be implemented to determine whether the rate of detected errors occurs too quickly, i.e., exceeds a maximum detection rate threshold.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fault detection circuit comprising:
   a system controller including at least one memory device and configured to control at least one electrical system; and
   a fault detection controller in signal communication with the system controller, the fault detection controller configured to detect at least one fault of the system controller and to control operation of the system controller based on comparison between a frequency of detected faults corresponding to the system controller and at least one frequency threshold value,
   wherein the fault detection controller allows restarting of the system controller an unlimited number of times in response to the frequency of system restarts due to detected faults being less than or equal to the frequency threshold value.

2. The fault detection circuit of claim 1, wherein the fault detection controller prevents restarting of the system controller and invokes a Failsafe mode in response to the frequency of detected faults exceeding the frequency threshold value.

3. The fault detection circuit of claim 2, wherein the Failsafe mode shuts down the system controller and prevents outputting signals therefrom.

4. The fault detection circuit of claim 3, wherein fault detection controller includes at least one counter that is dynamically incremented and decremented based on a time period.

5. The fault detection circuit of claim 4, wherein the fault detection controller allows restarting of the system controller in response to a count value of the at least one counter being less than or equal to a count threshold within a fault detection time period, and invokes the Failsafe mode in response to the count value exceeding the count threshold within the fault detection time period.

6. The fault detection circuit of claim 1, wherein the at least one fault comprises at least one of an unexpected change in a value stored in the at least one memory device, an unexpected change in configuration information of the system controller, and an incorrect output from the system controller.

7. The fault detection circuit of claim 1, wherein the at least one memory device comprises at least one of random access memory (RAM), a memory register, a flip-flop, and a binary counter.

8. A method of controlling a fault detection circuit, the method comprising:
    controlling, via a system controller including at least one memory device, at least one electrical system of a vehicle; and
    detecting, via a fault detection controller, at least one fault of the system controller; and
    controlling operation of the system controller based on comparison between a frequency of detected faults corresponding to the system controller and at least one frequency threshold value,
    wherein controlling the operation of the system controller includes restarting the system controller an unlimited number of times, via a control signal generated from the fault detection controller, in response to the frequency of system restarts due to detected faults being less than or equal to the frequency threshold value.

9. The method of claim 8, further comprising invoking a Failsafe mode of the system control via the control signal to prevent restarting of the system controller in response to the frequency of detected faults exceeding the frequency threshold value.

10. The method of claim 9, further comprising shutting down the system control to prevent outputting signal therefrom in response to invoking the Failsafe mode.

11. The method of claim 10, dynamically incrementing and decrementing at least one counter of the fault detection controller based on a time period.

12. The method of claim 11, further comprising:
    restarting, via the control signal generated by the fault detection controller, the system controller in response to a count value of the at least one counter being less than or equal to a count threshold within a fault detection time period; and
    invoking, via the control signal, the Failsafe mode in response to the count value exceeding the count threshold within the fault detection time period.

13. The method of claim 8, wherein the at least one fault comprises at least one of an unexpected change in a value stored in the at least one memory device, an unexpected change in configuration information of the system controller, and an incorrect output from the system controller.

14. The method of claim 8, wherein the at least one memory device comprises at least one of random access memory (RAM), a memory register, a flip-flop, and a binary counter.

* * * * *